(No Model.)
J. W. STOKES & F. J. PERRETT.
BOLT OR RIVET CLIPPER.
No. 433,914. Patented Aug. 5, 1890.
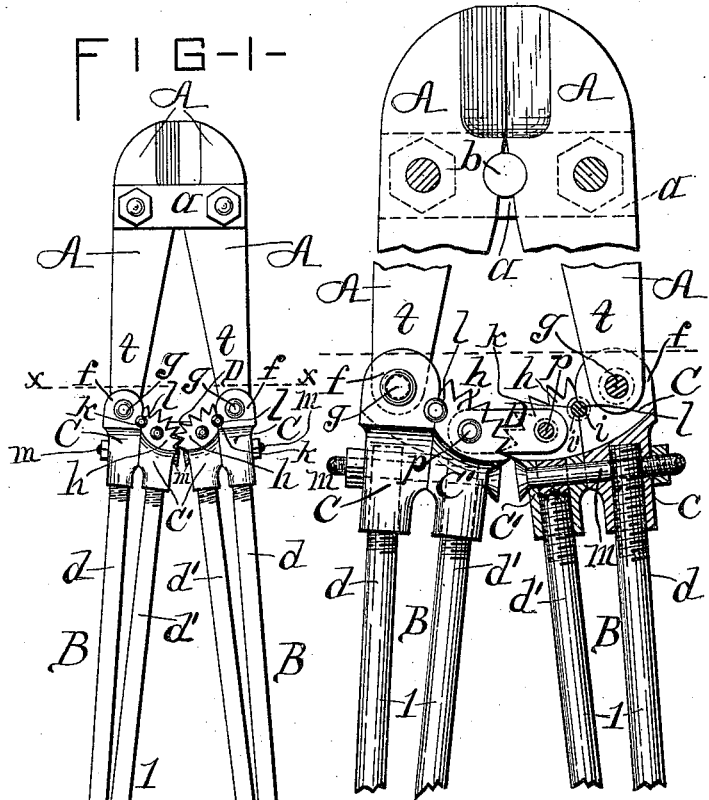
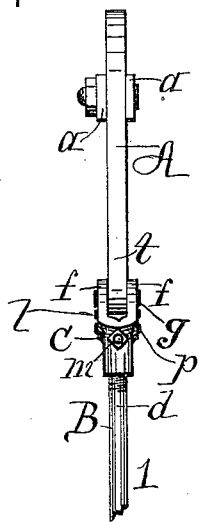
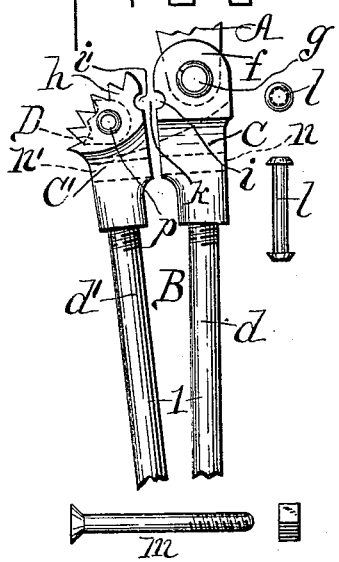
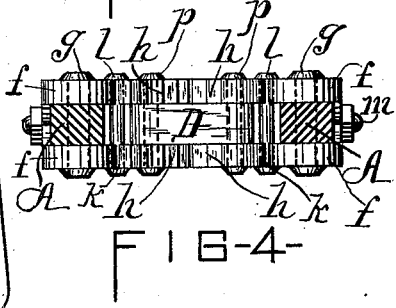
Witnesses—
Inventors—
James W. Stokes,
and Frank J. Perrett.
By their Attorney—

UNITED STATES PATENT OFFICE.

JAMES W. STOKES AND FRANK J. PERRETT, OF SYRACUSE, NEW YORK; SAID PERRETT ASSIGNOR TO SAID STOKES.

BOLT OR RIVET CLIPPER.

SPECIFICATION forming part of Letters Patent No. 433,914, dated August 5, 1890.

Application filed October 19, 1889. Serial No. 327,591. (No model.)

*To all whom it may concern:*

Be it known that we, JAMES W. STOKES and FRANK J. PERRETT, citizens of the United States, residing at Syracuse, in the county of Onondaga and State of New York, have invented certain new and useful Improvements in Bolt or Rivet Clippers; and we do hereby declare the following to be a full, clear, and exact description of the invention, such as will enable others skilled in the art to which it appertains to make and use the same, reference being had to the accompanying drawings, in which—

Figure 1 is a plan view of our improved bolt or rivet clipper; Fig. 2, an edge view of the upper portion of same—*i. e.*, the cutting or main portion of the implement; Fig. 3, an enlarged plan view of aforenamed portion of our implement with certain parts broken away and shown in section for better illustration of detail construction; Fig. 4, an enlarged transverse section taken upon line $xx$, Fig. 1, looking downward; and Fig. 5 is an enlarged detail of upper portion of one handle, attached head portions, and other component parts.

Throughout the several views similar letters and figures of reference indicate corresponding parts.

This invention relates to that class or description of implements or tools designed and adapted for the cutting in two of bolts, rivets, wrought-metal bars, rods, &c.

The object of our invention is to construct an implement of the class described that will, under all conditions, completely cut in twain bolts, rivets, and wrought-iron rods and bars; that is readily adjusted for the insuring of absolute and perfect contact of the cutting-edges of the cutting-blades of the implement; that is provided with removable interchangeable parts, and which combines simplicity and durability of construction with effectiveness, reliability, and ease of operation.

Our invention consists in the novel features of construction and combination of parts, as hereinafter described, and specifically enumerated in the claims hereunto annexed.

It is constructed as follows: A A designate the shearing or cutting blades of our implement, which blades are at their upper portion connected together by straps $a\ a$, extended across opposite sides of the said blades, with bolts or rivets passing through them, thereby permitting the required oscillating movement of the blades.

$b$ is a pin interposed between the adjacent edges of the cutting-blades A A, and which is securely seated in recesses in said edges, whereby the blades are effectually prevented from shifting longitudinally, as the straps $a\ a$, lying over the ends of the pin $b$, confine the said pin in proper position, as clearly illustrated in Fig. 3 of the drawings.

B B are the operating-handles (or levers) of our implement, comprising, respectively, a rod 1, bent over upon itself about midway its length, and twisted or otherwise brought securely together at a suitable distance from its outward bent or rounded extremity $s$, as at $e$, and creating below said point the loop portion $c$ (for the hand of the operator to grasp) and above the twist $e$ the longitudinal spring-arms $d\ d'$, practically parallel, except that they diverge from each other, starting at the twist or overlap $e$, forward to their ends, and thus causing their ends to be a suitable distance apart from each other, for the purpose described in the following paragraph.

The extremity of the arm $d$ of the respective handles B is screw-threaded at its end portion, and is screwed (or otherwise secured) into the head portion C, which is bifurcated a requisite distance, as shown, the walls created by the bifurcation terminating in ears $ff$, between which we pivotally mount by a pin $g$ the end of the shank $t$ of the overhead cutting-blade A, which pin we slightly rivet at its ends.

The extremity of the arm $d'$ of the respective handles B is screwed (or otherwise secured) into the head C', which head portion is bifurcated a required distance, and the vertical walls formed thereby terminate in the segmental gear portion $h\ h$.

In the adjacent edges of the adjacent heads C and C' of the respective handles B we form small transverse semicircular recesses $i\ i'$, which extend through the walls formed by the bifurcation, and within the practically circular aperture K, formed by the conjunction of the recessess $i\ i'$, is seated the adjusting-pin $l$, riveted at its ends for greater security.

The respective heads C and C′ of the respective handles B are held immovably together by a transverse headed bolt $m$, screwthreaded at its end, that extends through the perforations $n\,n'$, formed through the non-bifurcated portion of the adjacent heads, and which bolt coincidently passes through transverse perforations made in the secured ends of the arms $d$ and $d'$ of their respective handles. Said headed bolt $m$ being provided with a nut at its threaded extremity, the adjacent heads C C′ are held rigidly together. The bolt $m$, passing through the threaded ends of the arms $d\,d'$ of the handle, serves to more effectually secure the threaded ends of the aforenamed arms, preventing the turning or withdrawal of same from accident or otherwise entailed in operating the implement. If deemed advisable, we can allow the entering ends of the arms $d\,d'$, extending upward into their head portion, to terminate below the bolt $m$. Our preference, however, is the manner of construction first described, as an additional hold is thereby assured.

The segments $h\,h$ of the respective heads C′ (each secured to its companion head C) are connected with each other by a link or block D, fitted into the bifurcation of the said adjoining heads C′ by pivotal bolts or rivets $p$, passing through the parts and headed at their ends. This block D thereby holds the segmental gears $h\,h$ of the adjoining heads C′ C′ movably interlocked with each other, as clearly shown in the drawings.

By operating the handles (or levers) B B in the manner of shears the cutting-blades A A receive a similar motion, which, though lessened in degree, is correspondingly increased in power, owing to the immense fulcrum obtained by our construction and arrangement of parts; also, the interlocked segments necessarily compel the handles to work in perfect unison.

Our object in forming the recesses $i\,i'$ in the adjacent edges of the companion heads C C′, and the seating within the practically circular aperture formed by the two in unison, of a pin $l$, of desired circumference or size, is for the purpose of adjusting the cutter-blades A A and insuring the contact of their cutting-edges, thus allowing for the wear thereof from usage.

In using our implement we make use of at the outset a pin of medium size seated in the aperture K, formed by the union of the recesses $i\,i'$. As the cutting-edges of the cutting-blades become worn away through usage, it is essential that the cutting-edges of the cutters should continue to come together to insure perfect service, and to allow or compensate for said wear we replace the already-seated adjusting-pin $l$ by a pin of larger circumference or diameter, the size depending upon the degree to which the cutting-edges of the cutters are worn away. To remove an already-seated adjusting-pin to be replaced by one of a larger size, we remove the nut from the end of the bolt $m$, withdrawing said bolt, and place a piece of suitable metal between the shanks of the cutting-blades just back of the straps. Then open the divergent arms of the handle (or handles) sufficiently to spring said arms a suitable distance apart and let the adjusting-pin drop out of the aperture in which it is seated. Then place into the aperture a pin $l$, of larger diameter, allow the arms and connected heads to spring toward each other, insert the bolt $m$ in place and screw the nut up tightly, slightly riveting the ends of the substituted pin. The adjustment may be made to one or both the cutting-blades at one time or not, as may prove necessary.

It will be observed that by the insertion into position of an adjustment-pin of a larger size than the one removed the effect thereof is to throw the point of pivotature of one or both cutting-blades, (when they connect with the heads C,) or, rather, their shanks, outward from the center of the implement, and thereby impelling the cutting-edges of the cutting-blades toward each other, thus compensating for the loss of material from wear on said edges.

By constructing our handles (or levers) of an integral metallic rod formed as hereinbefore described we obtain a handle that is durable and effective, and permitting of ready adaptability to our novel construction of the class of implement described.

Preferably we construct all the parts entering into the formation of our implement of steel.

Having described our invention, what we claim as new, and desire to secure by Letters Patent, is—

1. In a bolt or rivet clipper, the heads C C C′ C′, each outer head C being adjustably and removably connected to an adjacent companion head C′, the adjacent inner heads C′ of each pair C C′ being pivotally connected together and their terminating segmental gears engaging one with the other, a cutting-blade pivotally connected to each head C C, a recess in the adjacent sides of the respective companion heads C C′, an adjusting-pin seated in the aperture formed by the aforesaid adjacent recesses, and a handle secured conjointly to each pair of heads C C′ by arms $d\,d'$, entering the lower or shank portion thereof, substantially as described.

2. In a bolt or rivet clipper, in combination, the separate heads C C C′ C′, bifurcated at their upper portion, each outer head C being held to its adjacent companion head C′ by a transverse fastening-bolt passing through said heads, the adjacent inner heads C′ of each pair C C′ pivotally connected together by a suitable link and their serrated segmental upper extremities engaging one with the other, a separate cutting-blade pivotally connected to the respective heads C of each pair of heads C C′, a recess within the adjacent parallel sides of the respective companion heads C C', that in conjunction creates an aperture in which is seated an adjusting-pin of required size interposed between the adjacent companion heads at their recessed portion, and a two-armed handle portion secured respectively to the companion heads C C' at their shank portions, substantially as described.

3. In a bolt or rivet clipper, the separate heads C C C' C', bifurcated at their upper portion, each outer head C being held to its adjacent companion head C' by a transverse fastening-bolt passing through said heads, the adjacent inner heads C' of each pair C C' pivotally attached together by a link-connection and their serrated segmental upward extremities engaging one with the other, a separate cutting-blade pivotally connected to the respective heads C of each pair of heads C C', a recess in the adjacent sides of the respective companion heads C C', that conjointly form an aperture in which is seated an adjusting-pin, and handles B, formed of an integral rod bent to shape and comprising, respectively, a loop, a twist, and a pair of longitudinally-extended arms that are attached to the respective companion heads C C' of the implement, all combined and operating together substantially as described, and for the purposes specified.

In testimony whereof we affix our signatures, in the presence of two witnesses, this 17th day of August, 1889.

JAMES W. STOKES. [L. S.]
FRANK J. PERRETT. [L. S.]

Witnesses:
WM. C. RAYMOND,
JOHN G. CLIFFORD.